United States Patent [19]
Krishnan

[11] 3,856,380
[45] Dec. 24, 1974

[54] PRISM TO SEPARATE A SECOND HARMONIC FROM ITS FUNDAMENTAL FREQUENCY

[75] Inventor: Kamala S. Krishnan, Palo Alto, Calif.

[73] Assignee: The United States of America as represented by the Secretary of the Navy, Washington, D.C.

[22] Filed: May 15, 1973

[21] Appl. No.: 360,500

[52] U.S. Cl................. 350/157, 350/147, 350/286
[51] Int. Cl. ............................................. G02b 1/24
[58] Field of Search .......... 307/88.3; 350/157, 147, 350/286, 287; 331/94.5 C

[56] References Cited
UNITED STATES PATENTS

| | | | |
|---|---|---|---|
| 3,515,464 | 6/1970 | Peifer et al..................... | 331/94.5 C |
| 3,564,454 | 2/1971 | Hook et al..................... | 331/94.5 C |
| 3,577,097 | 5/1971 | Hilberg.............................. | 350/157 |
| 3,700,307 | 10/1972 | Glenn ................................ | 350/157 |
| 3,700,308 | 10/1972 | Nicolai.............................. | 350/157 |

*Primary Examiner*—Ronald L. Wibert
*Assistant Examiner*—Michael J. Tokar
*Attorney, Agent, or Firm*—R. S. Sciascia; P. Schneider; W. Ellis

[57] ABSTRACT

A one-section, birefringent prism with an angle $\theta + 90 = \bar{\phi}_e + \rho + 90$, where $\rho$ is the angle the extraordinary ray will be refracted relative to the ordinary wave and $\bar{\phi}_e$ is the Brewsters angle for the extraordinary ray, such that the extraordinary ray will be incident at its Brewsters angle on the last prism face before it leaves the prism. The ordinary ray will pass through the face which has the aforesaid angle while the extraordinary ray will be internally reflected. The prism thus functions to separate the light incident thereon into its fundamental and second harmonic frequencies.

5 Claims, 7 Drawing Figures

PRISM TO SEPARATE A SECOND HARMONIC FROM ITS FUNDAMENTAL FREQUENCY

BACKGROUND OF THE INVENTION

1. Field of the Invention

This invention is concerned with optical polarizers and, more particularly, to an improved polarizing prism for use in a laser cavity to separate the second harmonic from the fundamental.

2. Description of the Prior Art

Generation of the second harmonic of a laser frequency through the use of a non-linear optical medium has come into quite general use. Efficient conversion into the second harmonic is possible by the use of the non-linear material inside the laser cavity taking advantage of the higher circulating power inside the cavity. When a polarized fundamental is used under phase-matched conditions, the second harmonic is produced with the orthogonal polarization. However, provision must be made to couple the second harmonic out of the cavity. Several techniques have been used in the past for this purpose. In one method, the second harmonic is reflected off the polarizing element used. In another, the cavity mirrors used are highly reflecting at the fundamental frequency and highly transmitting at the doubled frequency. These methods have the following disadvantages:

1. All of the second harmonic is not removed from the cavity, some remaining in the cavity. Frequently, the laser medium is highly absorbing (e.g., $Nd^{+3}$ at 5,300 A) at the doubled frequency resulting in a loss of this residual second harmonic;
2. Separation of the fundamental and the second harmonic in the output beam is an additional step that must be performed;
3. The special mirrors needed in one of the above techniques have limitations with regard to incident power densities.

SUMMARY OF THE INVENTION

According to the present invention, a light polarizing prism of calcite is provided for use with high powered laser beams. The orientation of the crystal and the geometry are selected to provide total internal reflection of one polarization and almost total transmission of the other polarization at its Brewster's angle.

OBJECTS OF THE INVENTION

An object of the invention is to utilize a single, birefringent prism to separate an incident beam of light into its fundamental and second harmonic frequencies.

It is a further object of the invention to provide more efficient transmission of one polarization with little, if any reflection.

It is a further object to eliminate the disadvantages of the prior art as stated as (1), (2) and (3) under the heading "Description of the Prior Art."

It is still a further object to provide a prism comprised of one section, which is thus much simpler in construction and operation.

Other objects, advantages and novel features of the invention will become apparent from the following detailed description of the invention when considered in conjunction with the accompanying drawings.

DESCRIPTION OF THE PREFERRED EMBODIMENTS

Figure 1:
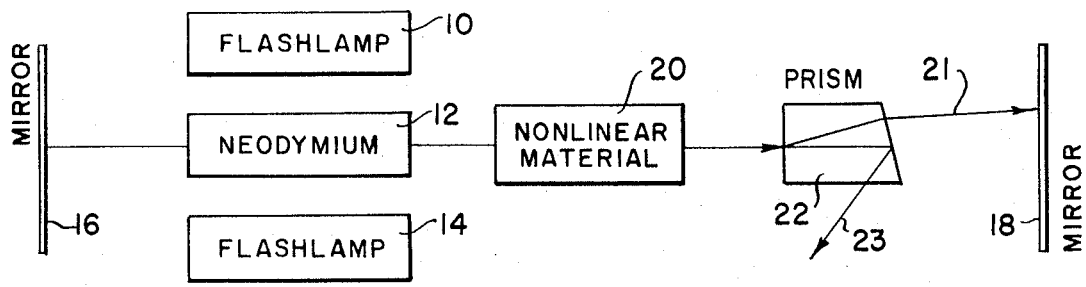
FIG. 1 shows the basic laser system in which the prism of this invention is used.

FIG. 1 shows the basic laser system for generating the fundamental and second harmonic. In this embodiment the actual laser generation is done by neodymium. The flashlamps 10 and 14 emit photons at the neodymium 12 which upon interaction with the neodymium atoms cause an inversion of the electron distribution in the energy levels. The mirrors 16 and 18 reflect the light back and forth through the neodymium amplifying the light more. The non-linear material 20, due to its non-linearity, will produce the fundamental and its harmonics when the fundamental is passed through the material. The output from the non-linear material is than incident on the prism 22 which is the subject of the present invention. This prism functions to separate the fundamental 21 from the second harmonic 23 due to its birefringent properties.

Definition of the different constants and variables:

$\theta$ = angle formed by the intersection of the hypotenuse and the leg of the triangle that is equal to the side of the rectangle;

$\rho$ = angle the extraordinary ray will be refracted to relative to the ordinary ray;

$\gamma$ = angle at which the optic axis is tilted to the normally incident beam;

$n_e$ = refractive index of the extraordinary ray;

$n_o$ = refractive index of the ordinary ray;

$\phi_e$ = Brewster's angle for the extraordinary ray.

The present invention is based on the use of a prism made of a suitable birefringent material. In the following, specific calculations are made for a neodymium laser using calcite as the prism material. Other laser wavelengths and birefringent materials can be used in place of neodymium and calcite.

Figure 2:
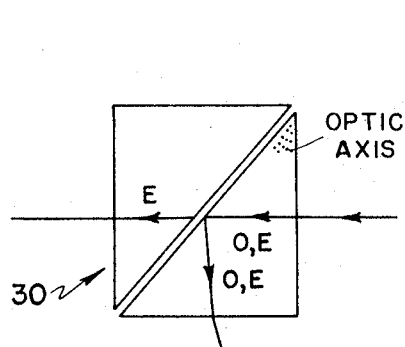
FIG. 2 shows the original design of the Glan-Foucault polarizing prism.

The proposed prism is similar to the Glan-Foucault prism 30, shown in FIG. 2, in its operation. However the orientation of the crystal and the geometry are selected to provide total internal reflection of one polarization and total transmission of the other polarization at its Brewster's angle.

The values of the important parameters related to the refractive properties of calcite are tabulated in Table I.

Table I

| Ray Description | Refractive Index | Critical Angle | Brewster's Angle |
|---|---|---|---|
| 1.06μ ordinary | 1.642 | 37° 32' | 31° 21' |
| 1.06μ extraordinary | 1.479 | 42° 33' | 34° 4' |
| 0.53μ ordinary | 1.663 | 36° 58' | 31° 1' |
| 0.53μ extraordinary | 1.488 | 42° 13' | 33° 54' |

In the original design of the Glan-Foucault polarizing prism, the geometry shown in FIG. 2 was used, with the optic axis along the prism corners. The transmitted polarization must have the higher critical angle or the lower refractive index. Hence, in calcite, it is the extraordinary polarization. The geometrical factors (the orientations of the reflecting plane and the optic axis) then imply that the extraordinary vibrations are normal to the plane of incidence (s vibrations), which do not have a zero minimum in reflectivity at the Brewster's angle. Hence, though the ordinary is totally reflected, the extraordinary is only partially transmitted and is partially reflected along with the ordinary polarization. It is also realized that no double refraction takes place in this orientation even for off-normal incidence at the first surface since the section of the index surfaces consists of two concentric circles.

Taylor modified the Glan-Foucault prism by choosing the orientation of the optic axis in the plane of the paper. Following arguments similar to those above, it is evident that the vibrations of the transmitted extraordinary polarization are now p vibrations. However, while the critical angle is about 37° for the ordinary, the Brewster's angle is about 34° for the extraordinary. Thus, though the reflectivity is less than that for the s vibrations, some extraordinary polarization is still reflected along with the ordinary.

It can be shown that for a calcite air interface, the reflectivity is 0.7 and 1.9 percent for angles of incidence of 37° and 38°, respectively. Thus, with the two surfaces in the regular prism, this loss amounts to 1.5 and 4 percent with an angular tolerance of only 1°. The reflectivity rises steeply toward 100 percent at about 42° (critical angle).

Figure 3:
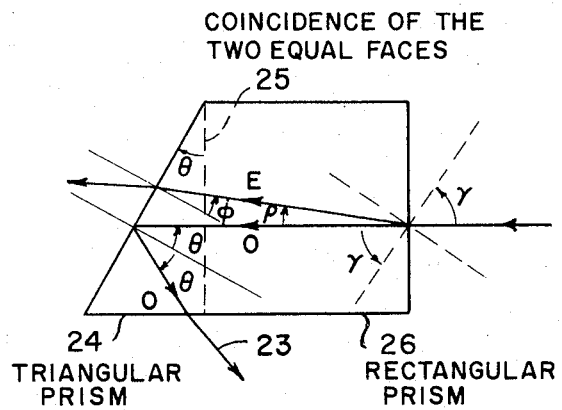
FIG. 3 is a side view of a light-polarizing prism embodying the present invention.

The single-section prism of the present invention is shaped in FIG. 3 as if it were a rectangular prism 26 with a right triangular prism 24 attached to one face of said rectangular prism, said right triangular prism being attached to said rectangular prism such that one of the leg faces of the triangular prism equals in area one of the faces of the rectangular prism and said two equal faces coincide exactly. In cross-section, the coincidence of these faces is shown by dotted line 25 in FIG. 3.

The major advantage of this shape is that only a unitary prism is needed to separate the ordinary and extraordinary rays with a very large spread angle. Thus no matching of prism sections is required. Nor is there any need to secure the prism sections together using cement or optical contacting.

Figure 7:
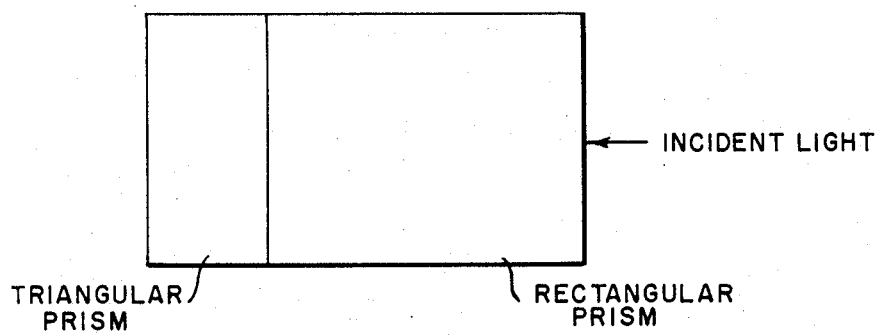
FIG. 7 is a top view of the prism embodying the present invention.

FIG. 7 shows a top view of the prism of this invention.

The proposed prism uses the doubly refracting property of the calcite to refract the extraordinary to make it incident at the Brewster angle. This is not possible in the geometry of the Taylor modification since for normal incidence, no double refraction occurs.

However, if the optic axis were tilted to the normally incident beam by an angle $\gamma$, the extraordinary beam will be refracted at an angle $\rho$ to the ordinary beam. The geometry shown in FIG. 3 applies.

Due to the prism geometry, $\theta$ is the angle of incidence of the ordinary ray and for total reflection it must lie between the critical angles of the ordinary and extraordinary. The angle of incidence of the extraordinary ray $\phi$, is related to $\theta$ and $\rho$.

$\phi$ must be equal to $\overline{\phi}$, the Brewster angle for the extraordinary ray, to accomplish perfect separation of the two polarizations. However, since the refractive index of the extraordinary changes with direction, the proper Brewster angle also changes with rotation of the optic axis in the plane of the paper. Thus, the following conditions and relations obtain:

1. $\phi co \leq \theta 21 \phi ce$
2. $\theta = \overline{\phi} + \rho$
3. $\tan = \sin \gamma \cos \gamma (n_e^2 - n_o^2)/n_e^2 \cos^2 \gamma + n_o^2 \sin^2 \gamma$
4. $\tan \overline{\phi_e} = (\cos^2 (\gamma + \rho)/n_o^2 + \sin^2 (\gamma + \rho)/n_e^2) 1/2$ To find the appropriate values of $\gamma$ and $\phi$ a graphical method may be used. First we calculate $\rho$ as a function of $\gamma$ using Eq. 3, giving the angular direction of travel of the extraordinary in the crystal. The corresponding index of refraction and the Brewster's angle $\overline{\phi}$ can be calculated using Eq. 4. The angle $\phi$ can now be computed using Eq. 2, as a function of $\gamma$.

Figure 4:
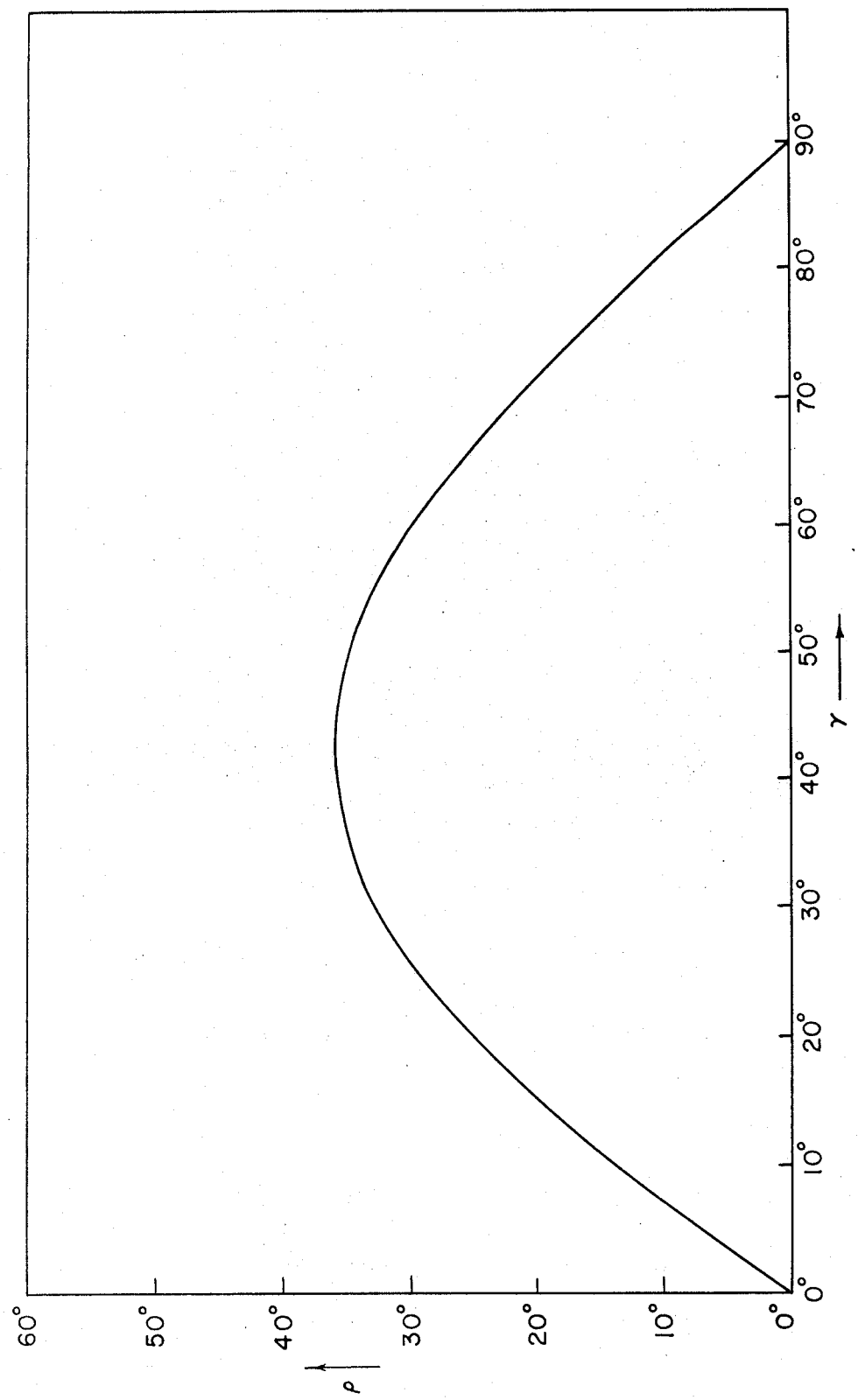
FIG. 4 is a plot of $\rho$ as a function of $\gamma$.
Figure 5:
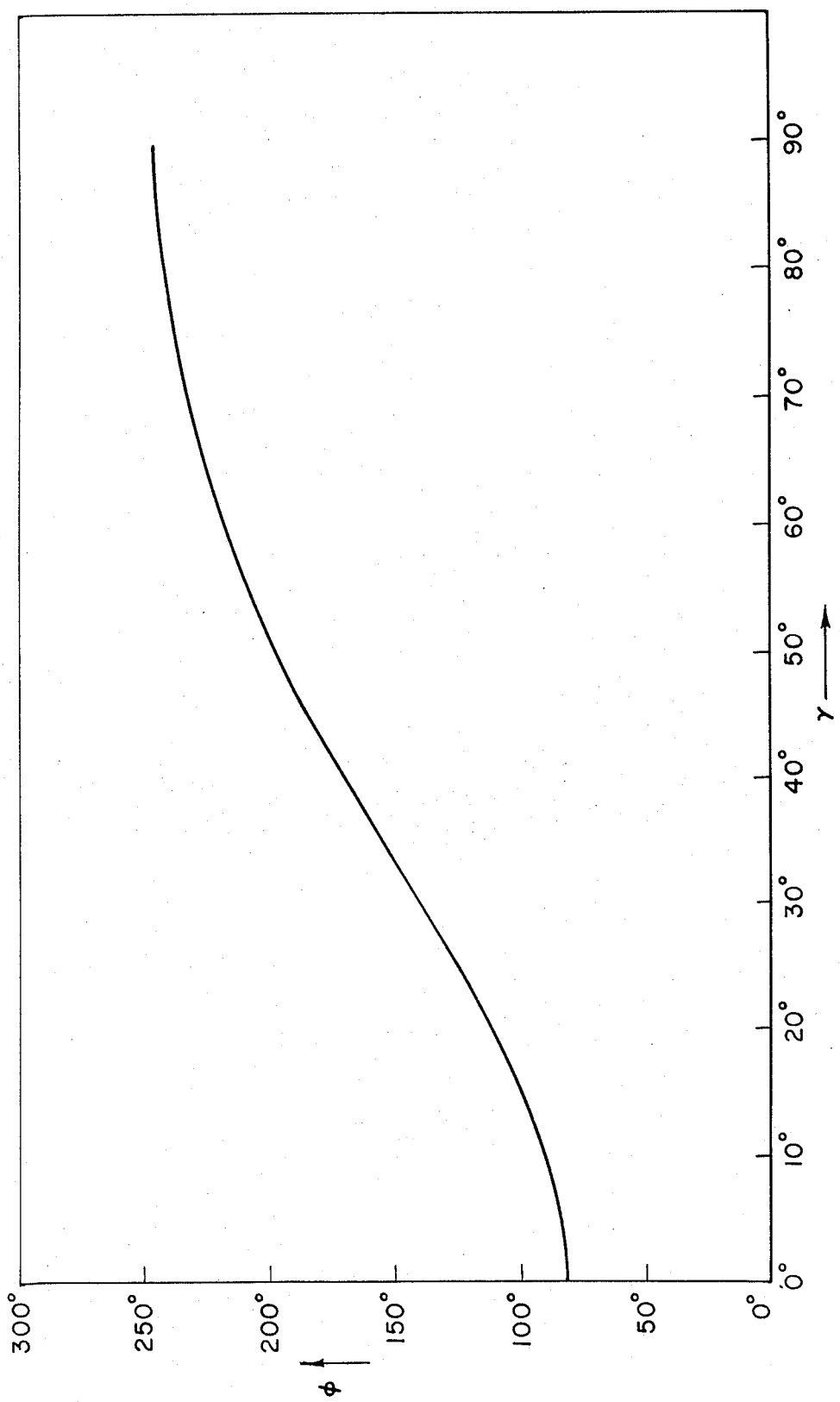
FIG. 5 is a plot of Brewster's angle $\phi$ as a function of $\gamma$ and $\rho$.
Figure 6:
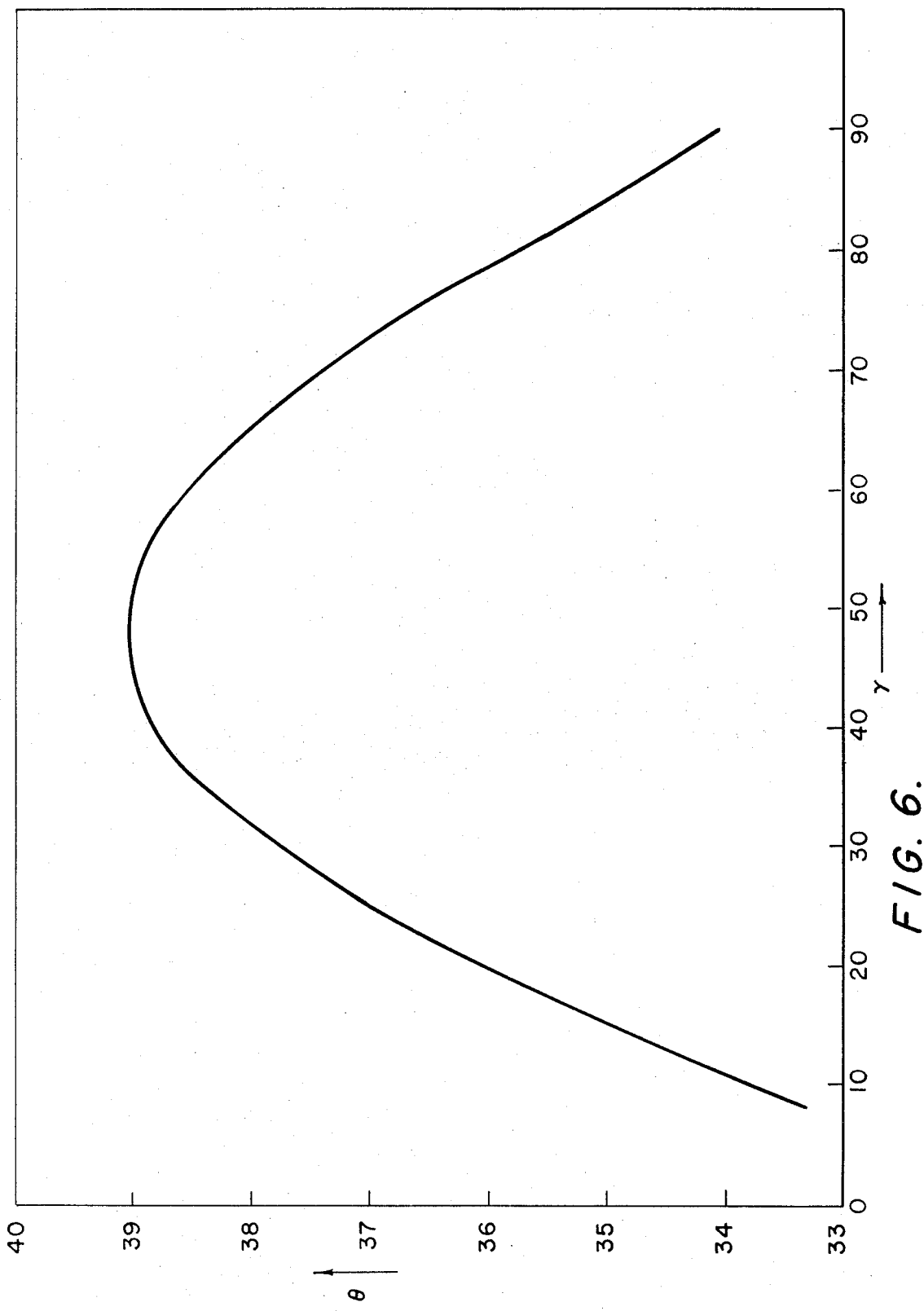
FIG. 6 is a plot of $\theta$ as a function $\gamma$.

Graphs of $\rho$, $\phi$ and $\theta$, all plotted against $\gamma$, are shown in FIGS. 4–6. It should be noted that only at this stage must choices be made with regard to the wavelengths of the reflected and transmitted beam to determine the refractive indices to be used in the calculations.

From the figures, it is seen that a wide range of angles satisfy condition 1 above for the desired separation of the two polarizations. In particular, for the choice of $\gamma = 47.5°$, the value of $\theta$ turns out to be close to the maximum at 39°1'. This value of $\theta$ may be desirable to maximize the angular aperture of the prism.

Obviously, many modifications and variations of the present invention are possible in light of the above teachings. It is therefore to be understood that, within the scope of the appended claims, the invention may be practiced otherwise than as specifically described.

What is claimed is:

1. A single-section prism for separating light impinging thereon into its fundamental and second harmonic frequencies, said prism being formed from a birefringement material and providing total internal reflection of one frequency and total transmission of the other frequency at its Brewster's angle by properly orienting the crystal and properly selecting said crystal's geometry a light beam incident on one face of said crystal being separated into its ordinary and extraordinary rays as it travels through said crystal, said extraordinary ray being incident on the back face of said crystal at its Brewster angle so that it is totally transmitted while said orindary ray is almost totally reflected.

2. A single-section prism as in claim 1, wherein said geometry of said prism is such that said prism is in the shape of a rectangular prism with a right triangular prism attached to one face, said right triangular prism being attached to said rectangular prism such that one of the leg faces of said triangular prism equals the area of one of the faces of the rectangular prism and said two equal faces coincide exactly.

3. A single-section prism as in claim 2, wherein the angle $\theta$, formed by the hypotenuse face and said leg face of said triangular prism which coincides with the face of said rectangular prism, is greater than the critical angle $\phi_{co}$ of the ordinary ray but less than the critical angle $\phi_{ce}$ of the extraordinary ray, and $\theta$ also is equal to the Brewster's angle for the extraordinary ray $\overline{\phi}$ plus the angle $\rho$, which is the angle at which the extraordinary ray will be refracted relative to the ordinary ray.

4. A single-section prism as in claim 1, wherein the laser used is a neodymium laser and the material used to make the prism is calcite.

5. A single section birefringent prism operating in conjunction with a laser to separate the light emanating therefrom into its fundamental and second harmonic frequencies, wherein a light beam is made to be incident normally on a face of said prism, said prism being oriented such taht its optic axis makes an angle $\gamma$ with said normally incident beam such that said beam is separated into its ordinary and extraordinary rays, further wherein the last prism face of said prism that the extraordinary ray is incident on before leaving said prism is inclined at an angle $\theta = \overline{\phi_e} + \rho$ relative to the prism face at which the beam is originally incident in order to make said extraordinary ray incident at its Brewster's angle $\overline{\phi_e}$ on said last prism face and thus totally transmit said extraordinary ray; $\rho$ being the angle at which the extraordinary ray is refracted relative to the ordinary ray.

* * * * *

UNITED STATES PATENT OFFICE
CERTIFICATE OF CORRECTION

Patent No. 3,856,380              Dated December 24, 1974

Inventor(s) Kamala S. Krishnan

It is certified that error appears in the above-identified patent and that said Letters Patent are hereby corrected as shown below:

Claim 1, line 7, the words -- so that -- should be inserted after the word "geometry";
line 8, "being" should read -- is --.

Signed and sealed this 15th day of July 1975.

(SEAL)
Attest:

RUTH C. MASON
Attesting Officer

C. MARSHALL DANN
Commissioner of Patents
and Trademarks